(No Model.) 2 Sheets—Sheet 2.
J. McKEE & T. BLACK, Jr.
MACHINE FOR MANUFACTURING RUBBER OR WATER PROOF CLOTH.
No. 306,765. Patented Oct. 21, 1884.
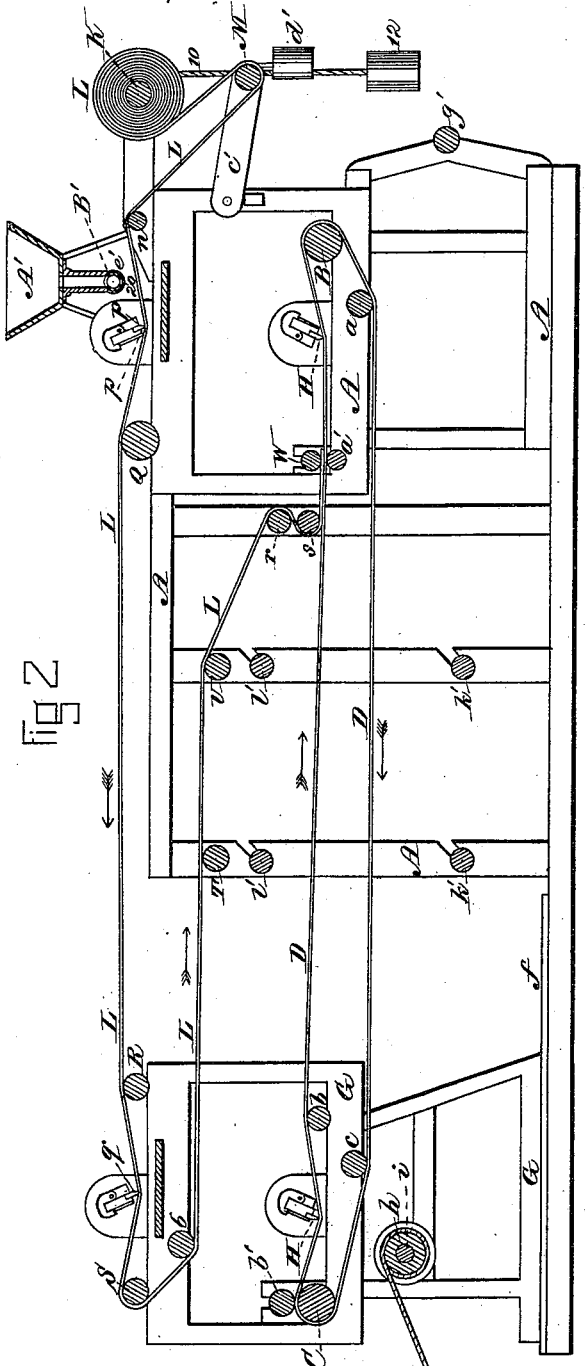
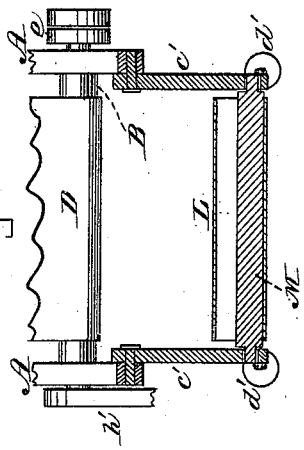
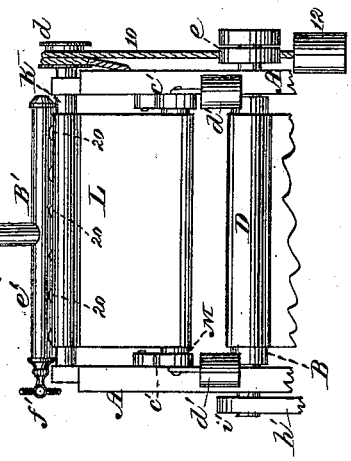
WITNESSES
N. J. Cambridge
W. Seagne
INVENTORS
John McKee
Thomas Black Jr.
per P. Teschemacher
Atty

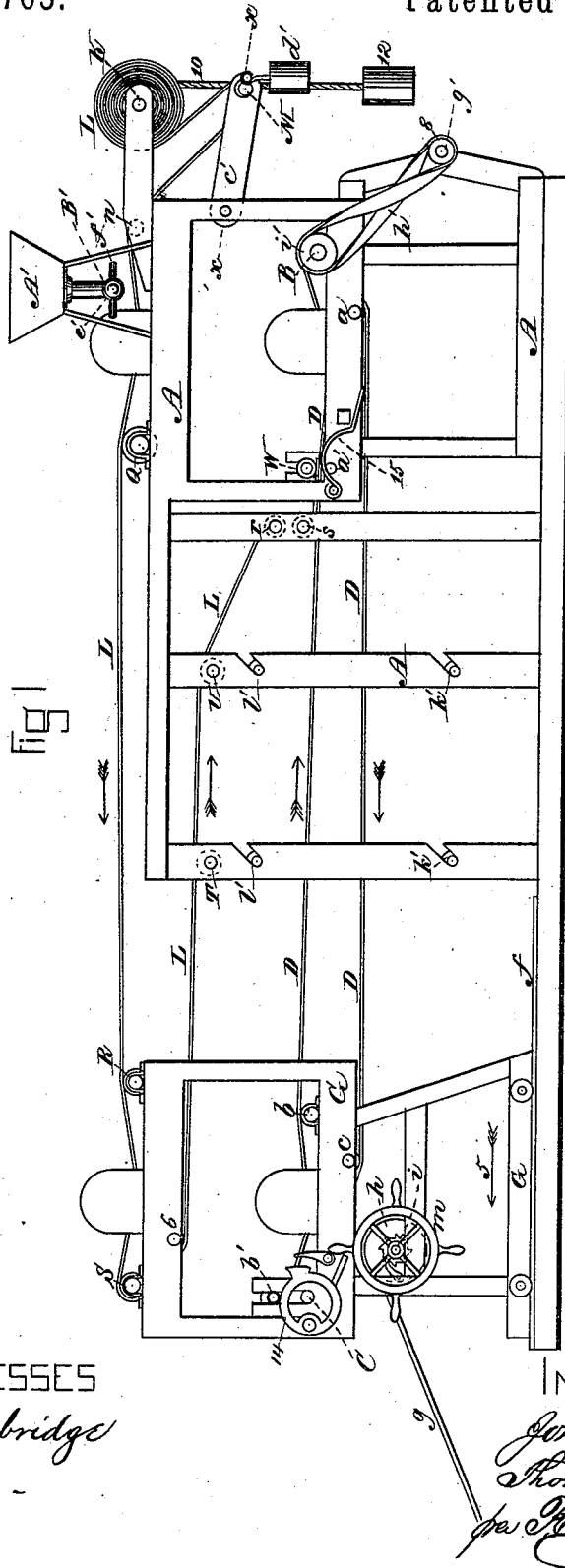

UNITED STATES PATENT OFFICE.

JOHN McKEE AND THOMAS BLACK, JR., OF CAMPELLO, MASSACHUSETTS.

MACHINE FOR MANUFACTURING RUBBER OR WATER-PROOF CLOTH.

SPECIFICATION forming part of Letters Patent No. 306,765, dated October 21, 1884.

Application filed June 14, 1884. (No model.)

*To all whom it may concern:*

Be it known that we, JOHN McKEE and THOMAS BLACK, Jr., of Campello, in the county of Plymouth and State of Massachusetts, have invented certain Improvements in Machines for Manufacturing Rubber or Water-Proof Cloth, of which the following is a full, clear, and exact description, reference being had to the accompanying drawings, making part of this specification, in which—

Figure 1 is an elevation of one side of a machine for producing double-textured rubber cloth constructed in accordance with our invention. Fig. 2 is a longitudinal vertical section through the center of the same. Fig. 3 is an elevation of a portion of one end of the machine. Fig. 4 is a horizontal section on the line $x\ x$ of Fig. 1.

Our invention relates to certain improvements in machines for manufacturing rubber or water-proof cloth composed of two layers or thicknesses of textile fabric, and known as "double-textured" cloth. It is generally customary, in making goods of this description, to coat two separate pieces of cloth of the required length with an adhesive water-proof substance in two separate machines of similar construction, in which the cloth is stretched in an endless belt over supporting rolls or cylinders, one of which is driven by suitable power. After these two pieces of cloth have been coated, one of them is cut and then wound up on a roll or beam and transferred to the other machine, where one end is cemented to the endless belt of coated cloth therein, which is then set in motion, causing the two pieces of cloth to be carried with their coated surfaces in contact between suitably-arranged pressure-rolls, whereby the two layers or thicknesses of cloth are firmly united to form the finished fabric.

Our invention has for its object to simplify this process and to effect a material saving in time and labor, whereby the cost of the fabric is greatly reduced.

To this end our invention consists in the combination, with devices for supporting, stretching, and driving an endless belt of cloth which is to form one layer or thickness of the finished fabric, and one or more scraping-blades for scraping the surface of the endless belt after the application thereto of the adhesive water-proof substance, of devices for holding, supporting, and guiding a second piece of cloth, one end of which is cemented to the endless belt, one or more scraping-blades for scraping the surface of the said second piece of cloth after the application thereto of the water-proof substance, and suitable pressure-rolls for pressing together and uniting the two thicknesses of coated cloth to form the finished fabric, by which construction and arrangement of parts the operation of coating the second piece of cloth and scraping its surface is performed at the same time that it is being united at another portion of its length with the endless band of coated cloth which forms the other layer or thickness of the fabric, thus avoiding the employment of two separate machines, and reducing the number of men required to perform the work, as hereinafter more particularly set forth.

Our invention also consists in a tension device of peculiar construction for keeping the cloth stretched evenly and uniformly from one edge to the other while it is passing over its guiding and supporting rolls to the endless belt to which it is united, as hereinafter set forth.

In the said drawings, A represents the framework of the machine, at one end of which, in suitable bearings, are supported the journals of a roll or cylinder, B, over which and a similar roll, C, at the opposite end of the machine is tightly stretched an endless belt, D, of the cloth which is to form one layer or thickness of the finished fabric, suitable guide-rolls, $a\ b\ c$, being provided to keep the upper and lower portions of the belt D at a suitable distance apart to prevent contact while in motion, the belt being driven by power applied through a driving-belt (not shown) to a pulley, $e$, Figs. 3 and 4, on the shaft of the roll B. The supporting-roll C and guide-rolls $b\ c$ are mounted in a carriage, G, which runs on a track, $f$, and is adapted to be moved in the direction of the arrow 5, Fig. 1, by means of a strap or cord, $g$, one end of which is attached to the floor or other stationary object, while the other end is wound around a drum, $h$, on a shaft, $i$, provided with a ratchet-wheel and retaining-pawl, and having a hand-wheel, m, by turning which the carriage G can be drawn in the direction of the arrow 5, to increase the distance between the two supporting-rolls B C, for the purpose of tightly stretching the cloth D after it has been placed upon the rolls and cemented together at its ends to form an endless belt. After the cloth D has been properly adjusted, as described, it is set in motion by rotating the cylinder B, when the adhesive water-proof substance or compound with which it is to be coated is poured over it or otherwise applied to its surface, which is then scraped to remove the surplus compound by passing beneath inclined stationary scraping-blades H H, one near each end of the machine and extending transversely across the same. The belt of cloth is preferably rotated about twelve times, or until its surface on one side has become properly coated with the rubber or water-proof compound, when it is ready to be united with another similarly-coated piece of cloth to form the finished fabric.

The machine, as thus far described, does not differ materially in construction or mode of operation from those commonly employed for coating cloth with rubber or water-proof compound, our present invention consisting in the combination, with such a machine, of the mechanism now to be described.

At the upper right-hand end of the frame-work A is supported in suitable bearings a roll, K, upon which is wound any suitable quantity of cloth, L, which is to be coated with adhesive water-proof substance and applied to the cloth D to form the second layer or thickness of the finished fabric. This roll K is provided with a suitable friction device—in the present instance a cord, 10, passing over a pulley, d, Fig. 3, on the end of its shaft, and provided with a weight, 12, for preventing the cloth L from unwinding any faster than it is required for use, thus avoiding any slackness as might otherwise occur. The cloth L, after leaving the roll K, passes under the roll M of the tension device, to be hereinafter described, thence up over a roll, n, and beneath an inclined scraping-blade, p, immediately in advance of which the adhesive water-proof substance or compound used for coating the cloth is applied thereto. After being scraped by the blade p to remove the surplus compound, the cloth passes over supporting-rolls Q R, having their bearings in the top rail of the frame-work A and carriage G, thence under a second scraping-blade, q, and around a roll, S, and under a roll, 6, back in the opposite direction over supporting-rolls T U, and between a pair of guide-rolls, r s, to the endless belt D, to which it is cemented at a point just in advance of a pair of pressure-rolls, W a', and thus as the belt D is rotated it draws with it the cloth L, the adhesive rubber-coated surfaces of the two pieces of cloth, D L, which are thus brought into contact, being pressed firmly together to unite them by the pressure of the rolls W a', the two thicknesses of cloth thence passing beneath the adjacent scraping-blade H, around the rolls B C, beneath the other scraping-blade H, and over the roll b back to the point where the end of the cloth L was first cemented to the belt D, when the machine is stopped, the cloth L having been applied to the entire length of the belt D and firmly united thereto.

Above the supporting-roll C is a heavy pressure-roll, b', by means of which the two layers or pieces of cloth are still further pressed together as they pass beneath it. When the pressure of the roll b' is not required, it is raised in its slotted bearings by means of cams 14 at its opposite ends, or in any other suitable manner, the upper pressure-roll, W, being also provided with a suitable lifting device, 15, for raising it off the cloth when not required for use.

The tension device for the upper piece of cloth, L, consists of two arms, c' c', pivoted to the frame-work A at their inner ends, and having loosely pivoted between their outer ends the roll M, beneath which the cloth passes, a weight, d', being attached to the outer end of each arm c', which serves to keep the adjacent end of the roll M firmly down upon the cloth, and by thus loosely pivoting the ends of the roll M to the arms c' c' each arm is made movable independently of the other, so that in case the cloth should become slack on one side more than on the other it will be instantly drawn tight by the action of the weight d' on that side, and all liability of the cloth L becoming wrinkled in its passage to the belt D is avoided.

The adhesive water-proof substance or compound which is applied to the upper cloth, L, is contained in a tank or receptacle, A', supported above the frame-work, and having a T-shaped discharge-pipe, B', provided on the under side of its horizontal portion e' with a series of outlet-apertures, 20, which are controlled by a suitable valve operated by a handle, f', whereby the desired quantity of the compound is allowed to drip or flow onto the surface of the cloth. The adhesive water-proof substance or compound is applied to the endless belt D by pouring it on with a dipper or in any other suitable manner. After the cloth L has been applied to the entire length of the belt D, and the machine has been stopped, as above described, the belt D is cut and one of its ends is secured to a take-up roll, g', at the lower right-hand end of the machine, this roll being driven by a belt, h', passing over a pulley, 8, on its shaft, and over a pulley, i', on the shaft of the roll B, and thus as the roll g' is rotated the finished fabric is wound up thereon, a series of rolls, k', preventing it from coming into contact with the floor, while the upper and lower portions may be prevented from frictional contact with each other while being drawn off by removing the rolls l', lifting up the upper portion of the belt D, and replacing the rolls l' beneath it, whereby it is supported as desired. As soon as the finished piece of cloth is entirely wound up on the roll g' a fresh piece of cloth is stretched in the form of an endless belt over the rolls B C, and then coated with the adhesive water-proof substance, as previously described, and the end of the cloth L cemented thereto, when the operation continues as before, and as soon as the cloth on the roll K is exhausted a roll containing a new supply is substituted therefor, and the end of the fresh piece of cloth cemented to the end of the former piece, L, the supply being made thus continuous.

By means of a machine constructed as above described it will be seen that the operation of coating and scraping two separate layers or thicknesses of cloth and uniting them to produce double-textured water-proof cloth can be effected in a single machine, and that the operation of coating and scraping one piece or layer of cloth is performed at one portion of its length at the same time and in the same machine that it is being united at another portion of its length to a second piece of cloth, a great saving in time and labor being thus effected, as much less handling of the goods is required in the process of manufacture, the space occupied by one machine is economized, and the labor of the men employed to operate it dispensed with; and we are thus enabled with a single machine to produce in a given time nearly double the quantity of cloth which it has been possible to produce with two separate machines as heretofore.

We do not claim the process of making double-textured water-proof cloth by uniting a piece of cloth coated with an adhesive water-proof substance which is to form one side of the finished fabric with a second piece of similarly-coated cloth stretched in the form of an endless belt and intended to form the other side of said finished fabric, as we are aware that this is not new; but we do claim a machine having its parts so constructed and arranged that the operation of coating and scraping one piece of the fabric can be performed at the same time and in the same machine that it is being united to a second piece of fabric stretched in the form of an endless belt, and which is also coated and scraped in the same machine as in the other piece of fabric, whereby the process of making goods of this description is greatly simplified, the necessity of employing two separate machines avoided, and a material saving effected.

What we claim as our invention, and desire to secure by Letters Patent, is—

1. In a machine for manufacturing double-textured water-proof cloth, the combination, with devices for supporting, stretching, and driving an endless belt of cloth which is to form one layer or thickness of the finished fabric, and one or more inclined scraping-blades for scraping the surface of said endless belt after the application thereto of the adhesive water-proof substance, of devices, substantially as described, for holding, supporting, and guiding a second piece of cloth cemented at one end to the said endless belt, one or more inclined scraping-blades for scraping the surface of the said second piece of cloth after the application thereto of the adhesive water-proof substance, and suitable pressure-rolls for pressing together and uniting the two thicknesses of coated cloth to form the finished fabric, all constructed to cooperate substantially as described.

2. The herein-described machine for manufacturing double-textured water-proof cloth, the same consisting of the frame A, cylinder B, with its driving mechanism, and the sliding carriage G, with its roll C, for supporting, stretching, and driving the endless belt of cloth D, and one or more inclined scraping-blades, H, for scraping the surface of the cloth, in combination with the roll K, for holding the second piece of cloth, L, suitable supporting and guiding rolls for said second piece of cloth, and one or more inclined scraping-blades for scraping the surface of the said second piece of cloth after the application of the adhesive water-proof substance thereto, and one or more pairs of pressure-rolls for pressing together and uniting the two layers or thicknesses of coated cloth, whereby the second piece of cloth, L, is coated and scraped at the same time that it is being united at another portion of its length to the endless belt of cloth D, all constructed to operate substantially in the manner and for the purpose set forth.

3. In a machine for manufacturing water-proof cloth, the combination, with the frame A and roll K, of the independent arms c' c', pivoted at their inner ends, and each provided at its outer end with an independent weight, d', and having loosely pivoted between them the roll M, beneath which the cloth passes, whereby the roll M is kept continuously in contact with the cloth across its entire width, substantially as and for the purpose described.

4. In a machine for manufacturing water-proof cloth, the combination, with the frame A and supporting-rolls B C, of the take-up roll g', adapted to be driven by suitable power, and a series of supporting-rolls, k' l', placed at points intermediate between the rolls B C, for the purpose of supporting the endless belt after being cut and while being wound up on the roll g', substantially as set forth.

5. In a machine for manufacturing water-proof cloth, the combination, with the devices for holding and supporting the cloth, and inclined scraping-blades for scraping the surface of the same, of the tank or receptacle A', provided with a T-shaped discharge-pipe, B', having a series of outlet-apertures controlled by a valve which is operated by a handle, f', substantially as and for the purpose described.

6. The improved process of making double-textured water-proof cloth, the same consisting in coating a fabric which is to form one side of the cloth with an adhesive water-proof substance, and scraping the surface of the same while passing in the same machine to a second piece of fabric stretched in the form of an endless belt, and uniting it at the same time that it is being coated and scraped with the said endless belt which is to form the other side of the cloth, substantially as set forth.

Witness our hands this 10th day of June, A. D. 1884.

JOHN McKEE,
THOMAS BLACK, JR.

In presence of—
DENNIS FEENEY,
JOHN CORISH.